(12) United States Patent
Holscher

(10) Patent No.: US 8,794,861 B2
(45) Date of Patent: Aug. 5, 2014

(54) CONNECTING DEVICE FOR TWO WORKPIECES, PARTICULARLY FOR BAR-TYPE HOLLOW PROFILED MEMBERS

(75) Inventor: Winfried K. W. Holscher, Engen (DE)

(73) Assignee: Holscher & Flaig Patent GBR, Aldingen (DE)

( * ) Notice: Subject to any disclaimer, the term of this patent is extended or adjusted under 35 U.S.C. 154(b) by 2469 days.

(21) Appl. No.: 10/528,544

(22) PCT Filed: Sep. 19, 2003

(86) PCT No.: PCT/EP03/10433
§ 371 (c)(1),
(2), (4) Date: Sep. 26, 2005

(87) PCT Pub. No.: WO2004/029465
PCT Pub. Date: Apr. 8, 2004

(65) Prior Publication Data
US 2006/0110215 A1    May 25, 2006

(30) Foreign Application Priority Data

Sep. 23, 2002  (DE) .............................. 202 14 703 U
Dec. 7, 2002   (DE) .............................. 202 18 988 U

(51) Int. Cl.
*F16B 7/18* (2006.01)
(52) U.S. Cl.
USPC ......................................................... 403/253
(58) Field of Classification Search
USPC ................. 403/381, 384, 387, 252, 255, 253; 411/72, 510
See application file for complete search history.

(56) References Cited

U.S. PATENT DOCUMENTS

| 3,456,973 | A | | 7/1969 | Peter |
| 3,545,625 | A | | 12/1970 | MacMillan |
| 4,775,259 | A | * | 10/1988 | Shell .............................. 403/348 |
| 5,085,547 | A | * | 2/1992 | Vanotti |
| 5,192,145 | A | | 3/1993 | Rixen et al. |
| 6,382,866 | B1 | | 5/2002 | Zihlmann |
| 7,293,935 | B2 | * | 11/2007 | Band et al. .................... 403/255 |

FOREIGN PATENT DOCUMENTS

| AU | 35151/89 B | * | 11/1989 |
| DE | 1 013 410 | | 8/1957 |
| DE | 42 44 395 | | 6/1994 |
| DE | 10151912 C1 | * | 6/2003 |
| DE | 10200964 A1 | * | 7/2003 |
| DE | 20 200401254 U1 | * | 12/2004 |
| EP | 0 004 374 | | 10/1979 |
| EP | 616134 A2 | * | 9/1994 |
| EP | 1 199 481 | | 4/2002 |
| FR | 1.480.511 | | 5/1967 |
| FR | 2.116.717 | | 7/1972 |
| FR | 2 369 411 | | 5/1978 |

* cited by examiner

*Primary Examiner* — Daniel P Stodola
(74) *Attorney, Agent, or Firm* — Bachman & LaPointe, P.C.

(57) ABSTRACT

A connecting device joins a first workpiece that is provided with an interior space, particularly a bar-type hollow profiled member, to another such workpiece by a screw or similar element, the shank of which penetrates an opening of the workpiece and can be inserted into an opposite element within the interior space. The shank of the clamping screw penetrates a sleeve of the connecting device, which is fixed within a longitudinal groove of one workpiece such that a threaded area of the clamping screw protrudes beyond the face of the workpiece and is provided with a screw head at a distance therefrom. The screw head is able to be inserted into an undercut longitudinal groove of the other workpiece. The sleeve is removably fastened within the longitudinal groove of the workpiece and is connected thereto by a groove/spring system that runs perpendicular to the longitudinal axis (A) thereof.

10 Claims, 4 Drawing Sheets

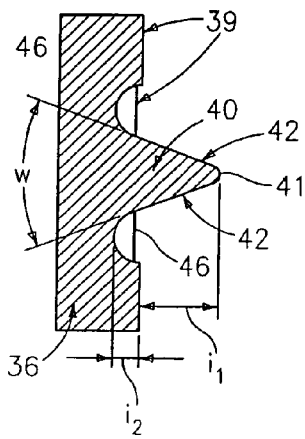
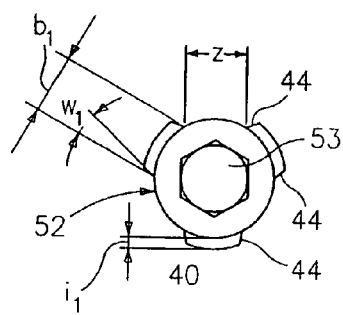
FIG. 4          FIG. 5
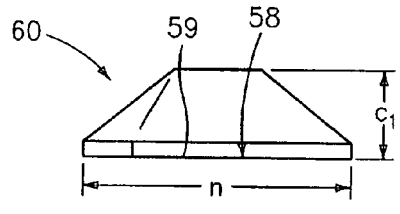
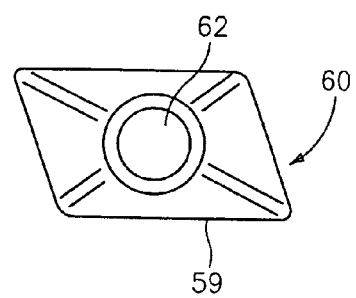
FIG. 6          FIG. 7

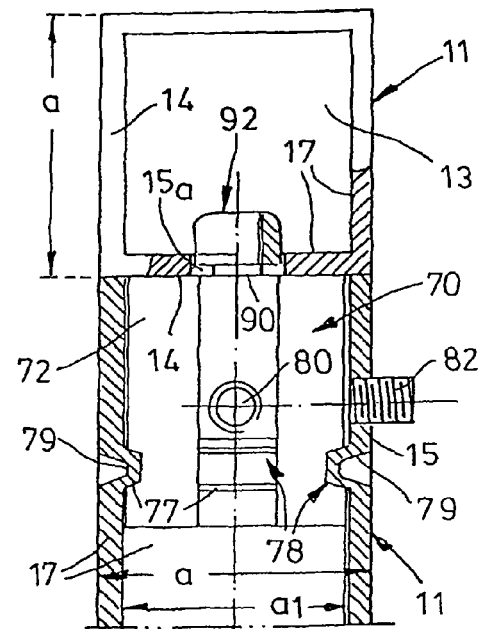
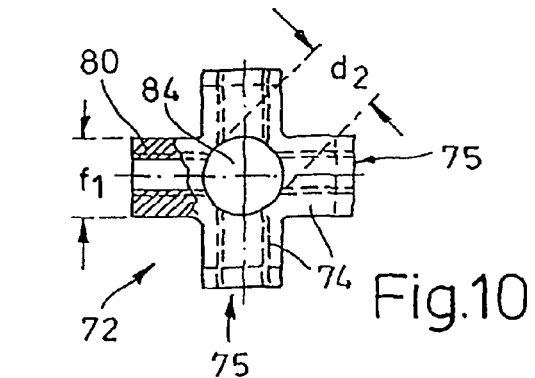
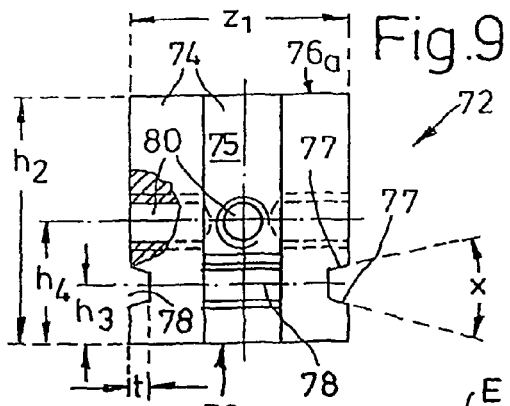
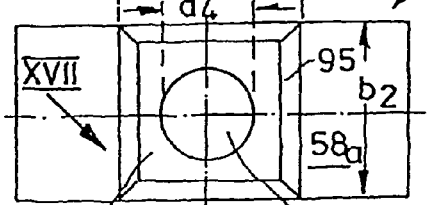
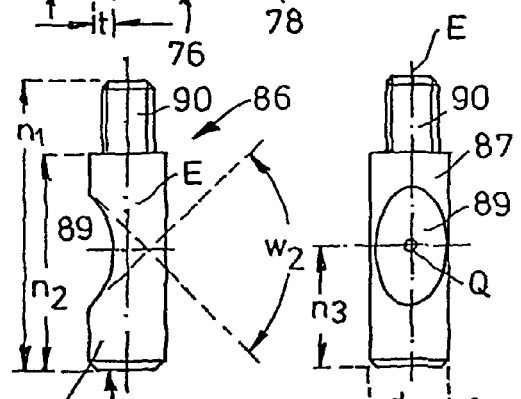
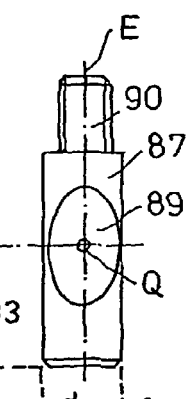
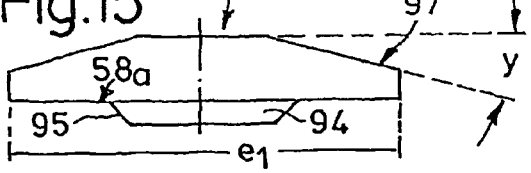
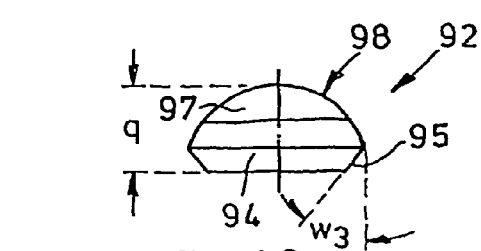
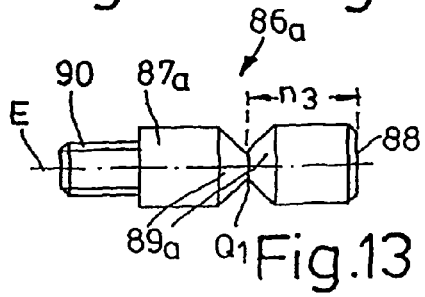

CONNECTING DEVICE FOR TWO WORKPIECES, PARTICULARLY FOR BAR-TYPE HOLLOW PROFILED MEMBERS

BACKGROUND OF THE INVENTION (1) Field of Invention

The invention relates to a connecting device for connecting a first workpiece having an interior space—in particular a bar-type hollow profile—to another workpiece by means of a screw or similar member, the shank of which passes through an opening of the workpiece and can be inserted into an opposing element in the interior space.

(2) Prior Art

The document DE 92 15 843 by the Applicant describes a connecting device for fixing in an undercut interior space of a longitudinal groove of a hollow profile or similar workpiece, having at least one dimension which exceeds the width of the narrow groove cross section for connecting a first workpiece having the longitudinal grooves to another workpiece which for its part has longitudinal grooves whose cross section opens toward the end of the profile. This element is used in particular for metal hollow profiles in respect of which the interior space is not accessible from outside; it is designed to be approximately cuboid and has at least two flank walls which lie opposite one another and are inclined at an angle and also a spring member which at one end is fixed on one of the inclined flank walls and at the other end engages over the narrow upper surface of the element with its free end. In the unstressed condition of the spring, the latter is arranged at a distance from the element. If the spring member is pressed against the nut element, the latter can readily be inserted into the undercut groove by its narrow side first.

In another connecting member for fixing in an undercut groove space of a longitudinal groove of a hollow profile according to DE 198 40 057 A1 by the Applicant and for connecting the hollow profile to another workpiece provided for its part with corresponding longitudinal grooves, at least one molding which corresponds approximately to the width of a longitudinal groove forming the narrow groove cross section is provided on the upper face of bracket arms of an angular shaped piece as a fixing or connecting device, and at least one screw passing through the bracket arm is fitted in the bracket arm; the width of the bracket arm exceeds the width of the longitudinal groove. Moreover, the cross section of the molding tapers away from the upper face of the bracket arm.

SUMMARY OF THE INVENTION

Knowing these conditions, the inventor set himself the aim of creating an operationally reliable possibility for fixing in particular extruded hollow profiles of polygonal—preferably rectangular—cross section, which are to be connected to one another approximately at right angles. In particular, the aim is for there to be an improvement to a system in which the profile end of one workpiece bears against a longitudinal side of the other workpiece and is held thereon—in a manner which is as twist-proof as possible.

According to the invention, the shank of the clamping screw passes through a sleeve of the connecting device, which sleeve is fixed in a longitudinal groove of one workpiece such that a threaded area of the clamping screw protrudes beyond the face of the workpiece and is provided with a screw head at a distance therefrom; said screw head is designed such that it can be inserted into an undercut longitudinal groove of the other workpiece.

According to a further feature of the invention, said sleeve is arranged such that it can be removably fixed in the longitudinal groove of the workpiece, wherein it has proven advantageous to connect the sleeve to the workpiece by a groove/spring system which runs transversely to the longitudinal axis of said workpiece. Said groove/spring system preferably comprises lateral outer ribs of the sleeve, which can be inserted in radial grooves of the workpiece as an opposing member. These outer ribs, which are approximately triangular in cross section, merge with their rib faces into shaped channels of the sleeve outer face. Moreover, seen in cross section, the rib crests of a number of outer ribs run parallel to one another and thus create a comb-like profile, the teeth of which cooperate with said channel-like opposing members in a retaining manner.

According to the invention, at least three groups of outer ribs parallel to the longitudinal axis of the sleeve are provided, which outer ribs, in the fixing position, engage in radial grooves; the latter are formed centrally in the groove bottom and in facing surfaces of shaped ribs which flank said groove bottom; said shaped ribs delimit the longitudinal groove running in an axially parallel manner in the profile outer face and overlap the undercut groove space thereof.

It has proven advantageous that, in the fixing position of the sleeve, one sleeve edge thereof is approximately flush with a face of the workpiece which receives it. Moreover, a ring, which is made of elastic material and surrounds the threaded area of the clamping screw, is arranged between the sleeve edge and the screw head, by virtue of which ring a better clamping position is achieved and damage to the thread is avoided.

Furthermore, in the clamped position, the screw head of the clamping screw—which has on its end face a blind hole of polygonal cross section—is seated on the second sleeve edge so that the threaded area protrudes as far as possible out of the sleeve and into the undercut longitudinal groove of the other hollow profile.

According to another feature of the invention, the screw head which can be screwed onto the clamping screw is designed in a plate-shaped manner, and its length is somewhat shorter than the width of the groove space of the undercut longitudinal groove which receives it, said longitudinal groove belonging to the second hollow profile which is to be connected at right angles. It has proven advantageous to design the abovementioned shaped ribs—which delimit the longitudinal groove on either side—in a hook-shaped manner and to design the faces of the hook ends which are directed toward the groove bottom as an abutment for the screw head. In this case, the height of the hook ends preferably corresponds to the height of the ring made of elastic material which is mounted between them.

In another refinement of the connecting device according to the invention, inserted into the interior space of the workpiece or hollow profile of rectangular cross section is a block-type connecting device which touches the inner faces of the four side walls of said profile, which connecting device is fixed in the hollow profile such that one of its faces is approximately flush with one of the faces of the hollow profile, and a threaded area of the clamping screw protrudes beyond this face into the interior space of the other hollow profile and is connected there to an opposing member which is designed as a screw stud and bears against the inner face of this other hollow profile.

It has proven advantageous to provide the connecting device with a shaped piece which has the shape of a cross in cross section, and to provide each of the side edges of the four shaped piece ribs thereof with a screw hole for a screw or screw bushing which passes through the side wall of the hollow profile.

According to a further feature of the invention, the side edge of the shaped piece rib comprises at least one channel-like incision which runs transversely to the longitudinal axis of the shaped piece, wherein the two side walls of the incision are preferably inclined at an angle with respect to one another such that the cross section of the incision expands outward, in order to receive a shaping of the side wall of the hollow profile in the clamped position of the shaped piece; preferably, two incisions lying opposite one another on either side of the longitudinal axis each receive one of the shapings, which shapings are produced for example by a notch impact.

Advantageously, a passage for a retaining bolt which forms the clamping screw runs in the longitudinal axis of the shaped piece; the screw holes of the shaped piece ribs then open into this passage since the screws guided therein are intended to fix the retaining bolt.

One retaining bolt which comprises, as clamping screw, a threaded bolt integrally formed axially on a bolt body is designed with at least one lateral trough in the region of said bolt body as a catch element for a screw bushing or screw provided in the screw hole of the shaped piece ribs.

In another embodiment, the bolt body comprises a peripheral constriction, delimited by two bolt sections tapering in opposite directions toward one another, likewise as a catch element, for a screw bushing or screw provided in the screw hole of the shaped piece ribs.

According to the invention, the strip-like screw stud of this embodiment moreover has on its lower face a central molding, in the region of which there is provided a likewise central screw opening for the threaded area of the clamping screw. A round slot is located on each molding for better fixing of the screw stud, the upper surface of which screw stud may be curved as part of a circle in cross section and/or in longitudinal section may have two opposing oblique faces.

Also within the scope of the invention is a connecting device of the type mentioned above in which the two workpieces or hollow profiles of rectangular cross section are miter-cut and are placed against one another at right angles by their oblique edges; in the corner region of the common interior space, at least two parallel angle brackets which fill the cross section of the interior space are fixedly connected to one another and to the hollow profiles by the screws or similar members. Use is preferably made of two angle brackets of approximately the same thickness, the bracket legs of which are in each case provided with a receiving hole for screws. Advantageously, one angle bracket is provided with screw holes which pass through its bracket legs as receiving holes and the other angle bracket is provided with correspondingly arranged blind holes.

Upon assembly, the screw holes of one angle bracket run coaxially with the blind holes of the other angle bracket and with openings in one of the profile side walls, and in each case jointly receive the screw or screw bushing.

BRIEF DESCRIPTION OF THE DRAWINGS

Other advantages, features and details of the invention will emerge from the following description of preferred examples of embodiments and with reference to the drawing; in the drawing:

FIG. 4 shows an enlarged detail from FIG. 3;

FIG. 5 shows the front view of FIG. 3;

FIGS. 6, 7 show the side view and plan view of a nut-like part of the connecting member;

FIG. 8 shows the partially cut-away front view of a hollow profile which is square in cross section and has a second hollow profile of the same shape fixed thereto at right angles by a connecting member, said second hollow profile being cut-away in the longitudinal direction;

FIGS. 9, 10 show the side view and—cross-shaped—plan view of part of the connecting member;

FIGS. 11, 12 show two views of a further—bolt-like—part of the connecting member;

FIG. 13 shows a view of another embodiment of the part shown in FIGS. 11, 12;

FIGS. 14, 15 show a bottom view and a side view of a nut-like part of the connecting member which compared to FIGS. 8 to 13 has been enlarged;

FIG. 16 shows the front view of FIGS. 14, 15;

DETAILED DESCRIPTION OF PREFERRED EMBODIMENT(S)

Figures 1, 2, 3:
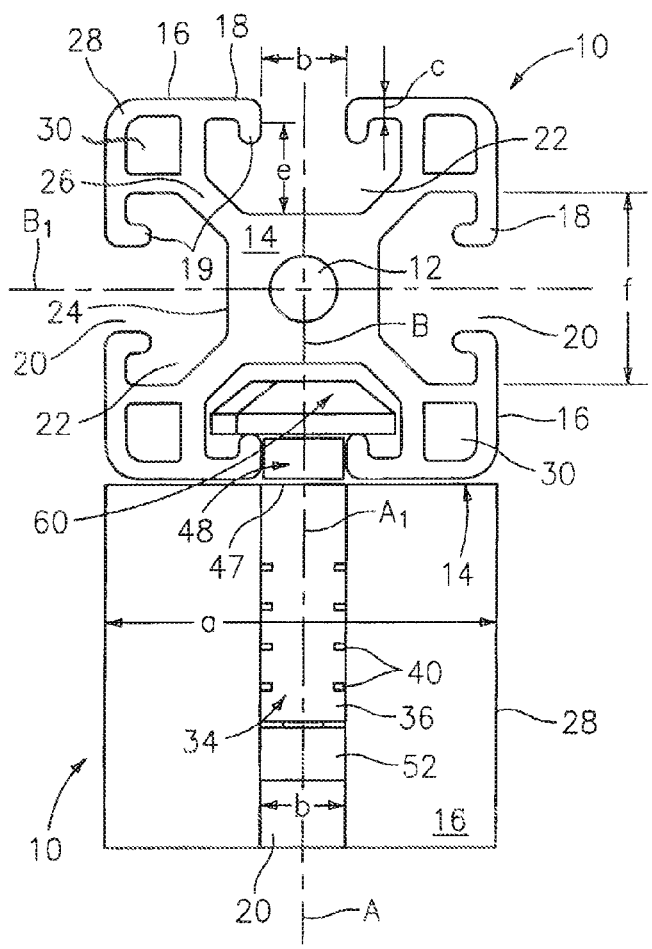
FIG. 1 shows the front view of an extruded hollow profile—having longitudinal grooves—with a connecting member inserted in one of the longitudinal grooves for a second hollow profile of the same shape which is placed at right angles to said first hollow profile.
FIG. 2 shows the—partially cut-away—second hollow profile of FIG. 1 without the connecting member.
FIG. 3 shows part of the connecting member in a side view which compared to FIG. 1 has been enlarged and is partially cut-away.

An extruded hollow profile 10 of square cross section having an outer side length a of in this case 40 mm with cross-sectional axes B, $B_1$ as axes of symmetry which in FIG. 1 are placed through the center—defined by a profile channel 12 running in the profile longitudinal axis A—of its face 14 has in each case in the center of its profile side faces 16 a longitudinal groove 20—delimited on either side by shaped ribs 18 which are hook-like in cross section and have a thickness c of in this case 2 mm—, which longitudinal groove 20 has a width b of for example 8 mm and in the direction of the profile longitudinal axis A merges into a groove space 22 which is undercut in cross section. The hook ends 19 of the shaped ribs 18 are directed toward the base or groove bottom 24 of the groove space 22. The latter is a channel-like recess overlapped by said shaped ribs 18, and the clear distance e of its base 24 from the shaped ribs 18 is in this case 10 mm and the maximum width f of the groove space 22 is approximately 20 mm.

An arm-like rib 26 is assigned to each of said four faces which form the groove bottom 24, on either side of their cross section, which arm-like ribs run inclined at an angle of 45° with respect to the cross-sectional axes B, $B_1$. These ribs 26 merge into the corner regions 28 of the hollow profile 10; in each of these corner regions 28 there is—parallel to the profile longitudinal axis A—a corner channel 30 of almost square cross section.

A second hollow profile 10 of identical cross section is placed at right angles—that is to say with its face 14—against a side face 16 of the top hollow profile 10 shown in FIG. 1, and is connected to the latter by a connecting member 34. The latter has a sleeve 36 having a length h of 25 mm and an external diameter d of 10.2 mm and an internal diameter $d_1$ of 6.0 mm; the cylindrical sleeve space 37 merges at the upper sleeve end into a hexagonal region 38 having an axial length $h_1$ of 6 mm. Protruding from the outer face 39 of the sleeve 36, in the region of said cylindrical sleeve space 37—at axial central spacings i of approximately 4 mm from one another—are radial outer ribs 40 having a protruding length $i_1$ of approximately 1 mm and a front width $b_1$ of 5 mm.

As shown in FIG. 4, the axially parallel section of the outer ribs 40 is triangular; the two rib faces 42 departing from the rib crest 41 define a cross-sectional angle w of almost 45°. These rib faces 42 in each case merge into a channel 46 formed in the outer face 39, which channel has a depth $i_2$ of 0.3 mm. The two side edges 41 of each of the outer ribs 40—arranged in three axially parallel groups of identical circumferential spacing z—are inclined at an angle $w_1$ of 15° with respect to one another, as shown in FIG. 5. Moreover, the length of the circumferential spacing z corresponds approximately to that of the front width $b_1$ of the outer ribs 40.

Mounted in the sleeve space 37 is a clamping screw 50, the screw head 52 of which has a hexagonal hole 53 for an Allen key (not shown), wherein the screw head 52 bears against the lower sleeve edge $47_t$ in the clamped position. Adjoining the screw head 52 is a round shank 54 which merges into a screw shank 55 as a threaded area. In FIG. 1, the free end thereof passes through a ring 48 made of elastic material which in the clamped position extends between the opposite hook ends 19 of the shaped ribs 18 of the hollow profile 10 and bears against the lower face 58 of a nut-like screw head 60; the latter is seated on the end faces of the two hook ends 19. The screw head 60, which is strip-like in plan view and has a thickness $c_1$ of approximately 6 mm and a diagonal length n of 25 mm, has a lozenge-shaped contour as shown in FIGS. 6 and 7 and has a central screw hole 62 for the clamping screw 50. The upper surface of the screw head 60 slopes away from the screw hole 62 towards the bottom edge 59.

In order to connect the two hollow profiles 10, the sleeve 36 of the connecting member 34 is screwed into a groove space 22 of the bottom hollow profile 10 in FIG. 1, wherein as the sleeve 36 is turned its outer ribs 40 penetrate into the groove bottom 24 and the side faces of the hook ends 19 and form radial grooves 32 as shown in FIG. 2. However, it is also possible to form these radial grooves 32 in some other way. In this case, the hollow profile 10 is then inserted in an axially parallel manner until the outer ribs 40 of the sleeve 36 engage in the correspondingly formed radial grooves 32 which—as mentioned above—are provided in the groove bottom 24 and in the facing side faces of the hook ends 19. In this position of the sleeve 36, the upper sleeve edge 47 is flush with the face 14 of the hollow profile 10 and the longitudinal axis $A_1$ of the sleeve 36 is parallel to the profile longitudinal axis A.

If the sleeve 36 is fixed in this way and the screw head 54 is inserted into one of the groove spaces 24 of the other or top hollow profile 10, the clamping screw 50 can be turned in the sleeve 36 and thus the screw head 60 can be pressed with its lower face 58 against the hook ends 19; this press fit is a secure hold for the unit consisting of the two hollow profiles 10 at right angles to one another.

The two hollow profiles 11 shown in FIG. 8, which are connected to one another at right angles, have a square cross section with an outer side length a of for example 40 mm and are extruded from an aluminum alloy. The connecting member 70 in this case comprises a steel shaped piece 72 having a height $h_2$ of 38 mm and a cross-shaped contour, the contour length $z_1$ of which is in this case 34 mm and which can thus be inserted into the hollow profiles 11 having a corresponding clear width $a_1$; the width $f_1$ of the metal ribs 74 which form the steel shaped piece 72 is 12 mm. The longitudinal axis $A_1$ of the steel shaped piece 72 coincides with the profile longitudinal axis A of the hollow profile 11. Each of these metal ribs 74 is provided on its edge 75—at a central distance $h_3$ of 9 mm from the lower longitudinal edge 76—with an incision 78 having a depth t of 3 mm, which incision expands conically outward in cross section at an angle x of approximately 35° by virtue of inclined side walls 77. At a central distance $h_4$ of approximately 20 mm from said lower longitudinal edge 76 there is, on each edge 75 of the metal ribs 74, a screw hole 80 for a screw bushing 82 which passes through a side wall 17 of the hollow profile 11 at an opening 15; said screw bushing fixes the steel shaped piece 72 in the hollow profile 11 such that the face 14 thereof is flush with the upper longitudinal edges $76_a$ of the ribs 72. Moreover, in order to intimately connect the steel shaped piece 72 to the hollow profile 11, a shaping 79 is made in each case in two opposite side walls 17, which shaping conforms to the inner faces of the adjacent incisions 78. The depth and length of these shapings or notches 79 are defined by the shape of said incisions 78.

FIG. 10 shows a central passage 84 having a diameter $d_2$ of 12 mm for a retaining bolt 86 which can be displaced therein, said retaining bolt having an overall length $n_1$ of 45 mm; a bolt body 87 of the retaining bolt 86, which bolt body has a length $n_2$ of 33 mm and fits into the passage 84, merges into an M8 threaded bolt 90. In the bolt body 87, at a distance $n_3$ of 18 mm from the bottom face 88 thereof, there can be seen the center Q of a trough shaping 89 having an oval contour (FIGS. 11, 12). Furthermore, the shape thereof in longitudinal section is defined by a right angle $w_2$ which runs parallel to the bolt axis E.

In the embodiment of the retaining bolt $86_a$ shown in FIG. 13, a constriction $Q_1$ can be seen in the bolt body $87_a$—at a distance $n_3$ of 18 mm from the bottom face 88—, wherein conically expanding bolt sections $89_a$ depart from said constriction.

Both shapings 89, $Q_1$ serve to receive the inner end of the aforementioned screw bushing 82 in order to fix the retaining bolt 86 or $86_a$ in position.

In the clamped position, the threaded bolt 90 passes through a hole $15_a$ in a side wall 17 of the top hollow profile 11 in FIG. 8, so that a screw stud 92 to be arranged in the profile interior space 13 thereof can be fitted thereon as a nut having a length $e_1$ of 30 mm and a width $b_2$ of 15 mm.

Figure 17:
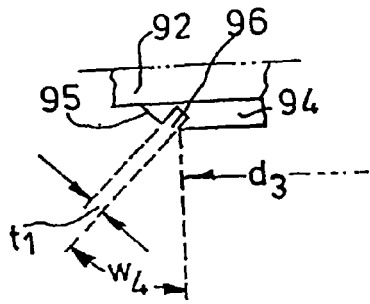
FIG. 17 shows a partial view along the arrow XVII in FIG. 14 after machining of this part.

The lower face $58_a$ of the screw stud 92 having an overall height q of approximately 7 mm is provided in the longitudinal center with a stepped molding 94 having a width $b_3$ of 11 mm; in the side face 95 thereof, which is inclined at an angle $w_3$ of 40° with respect to the vertical, there is a round slot 96 having a width $t_1$ of approximately 1.2 mm as shown in FIG. 17, which round slot is inclined at an angle $w_4$ of 40° with respect to the vertical. The round slot 96, the internal diameter $d_3$ of which is approximately 14 mm, surrounds a central screw passage 100 having a diameter $d_4$ of in this case 6.8 mm.

FIGS. 15, 16 in particular show two oblique faces 97 inclined at an angle y of 15° in the longitudinal direction of the upper face 98 of the screw stud 92, and also the curvature of the latter.

Figure 18:
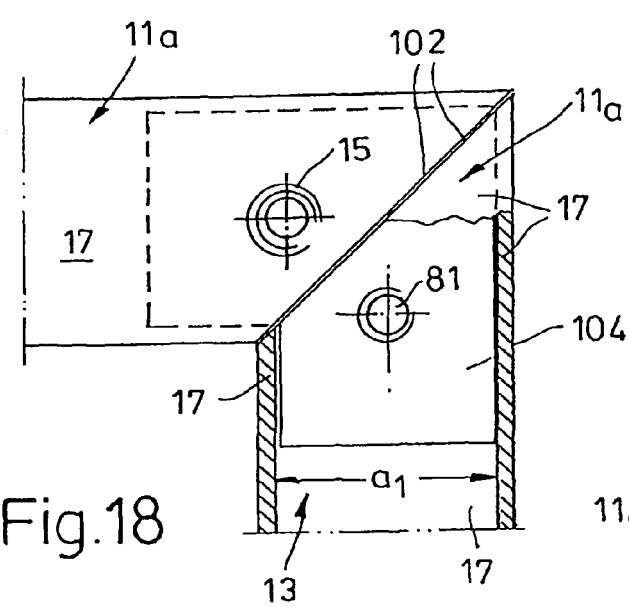
FIG. 18 shows a partially cut-away side view of a frame corner consisting of two hollow profiles held together by connecting members, said hollow profiles each having a square cross section.
Figure 19:
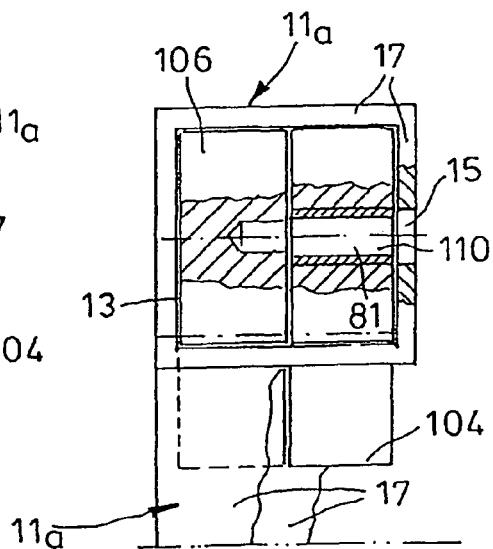
FIG. 19 shows a partially cut-away front view of FIG. 18.

The hollow profiles $11_a$ of square cross section shown in FIGS. 18, 19, which are miter-cut and bear against one another by their inclined edges 102, are held together by a pair of angle brackets 104, 106 which have a thickness $c_2$ and are made of light metal, which angle brackets together fill the cross section of the profile interior spaces 13 in the corner region. Their leg length $q_1$ in this case is 50 mm for a leg width $b_4$ which corresponds to the clear profile width $a_2$.

Figure 20:
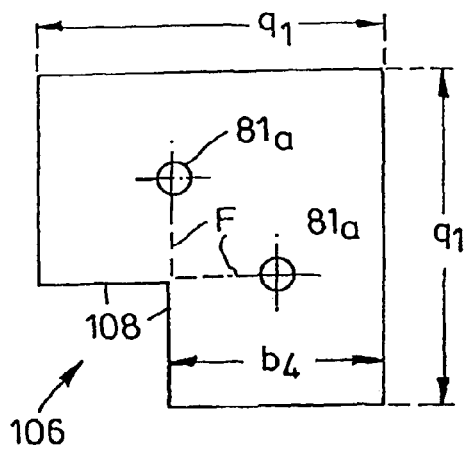
FIG. 20 shows a side view of one of the two connecting members of FIGS. 18, 19.
Figure 21:
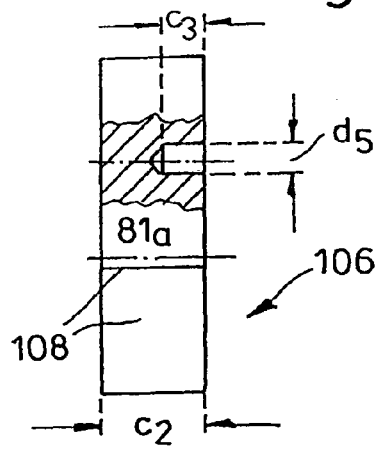
FIG. 21 shows the front view of FIG. 20.

Approximately in the continuation of the two inner edges 108 of the two angle brackets 104, 106 (lines F in FIG. 20) there is—in the center of the width—in each case one receiving hole 81 and 81$_a$. In the angle bracket 104 conforming to the side wall 17 having the passage 15, these are designed as continuous screw holes 81 with an inserted threaded bushing 110 made of steel, as can be seen in particular in FIG. 19; the receiving holes 81$_a$ of the other angle bracket 106 are blind holes, the depth $C_3$ of which corresponds approximately to half the thickness of the angle bracket 106. The diameter $d_5$ thereof is also smaller than that of the screw holes 81.

Following the insertion of connecting screws (not shown) into the passage 15 and also the screw hole 81 and the blind hole 81$_a$, said screws are tightened and the described bracket unit is assembled.

The invention claimed is:

1. A connecting device for connecting a first workpiece having an interior space to a second workpiece, said connecting device comprising:
   a clamping screw and a sleeve;
   the clamping screw having a shank which engages in a longitudinal groove of the first workpiece and which can be inserted into an opposing element in an interior space of the second workpiece;
   the shank of the clamping screw passing through the sleeve;
   said sleeve being provided with outer ribs and being fixed in the longitudinal groove of the first workpiece such that a threaded area of the clamping screw protrudes beyond a face of the first workpiece;
   said clamping screw being provided with a screw head;
   the threaded area of the clamping screw having a nut screw head which can be fitted thereon;
   said nut screw head being designed such that said nut screw head can be inserted into an undercut longitudinal groove of the second workpiece;
   the sleeve having at least three groups of said outer ribs which are parallel to a longitudinal axis of the sleeve;
   said outer ribs, in a fixing position, being assigned to radial grooves in a groove bottom and in facing surfaces of the longitudinal groove; and
   wherein one of said outer ribs is approximately triangular in cross section and merges with its rib faces into shaped channels of a sleeve outer face.

2. The connecting device as claimed in claim 1, wherein rib crests of a number of said outer ribs run parallel to one another.

3. The connecting device as claimed in claim 1, wherein rib crests of a number of said outer ribs define a common annular contour.

4. The connecting device as claimed in claim 1, wherein the outer ribs of the sleeve can be inserted in said radial grooves of the first workpiece.

5. The connecting device as claimed in claim 1, wherein one sleeve edge of the sleeve fixed in the first workpiece is approximately flush with the face of the first workpiece.

6. The connecting device as claimed in claim 1, wherein the nut screw head which can be screwed onto the clamping screw is designed in a plate-shaped manner.

7. The connecting device as claimed in claim 6, wherein a length of the nut screw head is shorter than a width of a groove space of the undercut longitudinal groove which receives the screw head.

8. A connecting device for connecting a first workpiece having an interior space to a second workpiece, said connecting device comprising:
   a clamping screw and a sleeve;
   the clamping screw having a shank which engages in a longitudinal groove of the first workpiece and which can be inserted into an opposing element in an interior space of the second workpiece;
   the shank of the clamping screw passing through the sleeve;
   said sleeve being provided with outer ribs and being fixed in the longitudinal groove of the first workpiece such that a threaded area of the clamping screw protrudes beyond a face of the first workpiece;
   said clamping screw being provided with a clamping screw head;
   the threaded area of the clamping screw having a nut screw head which can be fitted thereon;
   said nut screw head being designed such that said nut screw head can be inserted into an undercut longitudinal groove of the second workpiece;
   the sleeve having at least three groups of said outer ribs which are parallel to a longitudinal axis of the sleeve, which said outer ribs, in a fixing position, are assigned to radial grooves in a groove bottom and in facing surfaces of the longitudinal groove;
   one sleeve edge of the sleeve fixed in the first workpiece being approximately flush with the face of the first workpiece; and
   wherein a ring, which is made of elastic material and surrounds the threaded area of the clamping screw, is arranged between the one sleeve edge and the screw head.

9. The connecting device as claimed in claim 8, wherein the outer ribs delimiting the longitudinal groove are designed in a hook-shaped manner and faces of hook ends which are directed toward the groove bottom are designed as an abutment for the nut screw head.

10. The connecting device as claimed in claim 9, wherein the hook ends have a height which corresponds approximately to a height of the ring made of elastic material which is mounted between them.

* * * * *